United States Patent [19]

Stuck

[11] Patent Number: 4,924,767
[45] Date of Patent: May 15, 1990

[54] CONVEYORIZED COOKING APPARATUS

[75] Inventor: Robert M. Stuck, Clover, S.C.

[73] Assignee: Marshall Air Systems, Inc., Charlotte, N.C.

[21] Appl. No.: 866,478

[22] Filed: May 23, 1986

[51] Int. Cl.$^5$ .............................. A47J 37/04
[52] U.S. Cl. ..................... 99/423; 99/443 C; 99/386; 219/445
[58] Field of Search ............ 99/443 C, 447, 386, 99/389, 373, 374, 377, 422, 423; 219/445

[56] References Cited

U.S. PATENT DOCUMENTS

| | | | |
|---|---|---|---|
| 2,659,800 | 11/1953 | Zander | 99/389 X |
| 2,775,677 | 12/1956 | Schuetze | 219/445 |
| 3,023,298 | 2/1962 | Wells | 219/445 |
| 3,400,651 | 9/1968 | Hatch | 99/443 C X |
| 3,693,452 | 9/1972 | McGinley et al. | 99/443 C X |
| 3,739,712 | 6/1973 | Duning | 99/386 X |
| 3,835,760 | 9/1974 | Rekesius | 99/443 C X |
| 4,176,589 | 12/1979 | Stuck | 99/386 |

Primary Examiner—Werner H. Schroeder
Attorney, Agent, or Firm—Daniel E. McConnell

[57] ABSTRACT

This invention relates to conveyorized cooking apparatus and particularly to such apparatus useful in a commercial environment such as a fast service restaurant in which rapidly changing variable loads must be accommodated. This invention accomplishes conveyorized cooking of servings of foodstuffs in such a way that the effects of variations in load are minimized or eliminated by eliminating or reducing the infuence of stored thermal energy on cooking capabilities so that stored energy may be esentially ignored as being ineffective to cause variation in product quality. This is accomplished by using heaters of low thermal mass such that the rate of thermal decay or temperature fall in the absence of thermal load imposed by servings of foodstuffs prevents the cyclical storage of thermal energy and thereby avoids the overcooking of foodstuffs during periods of light usage. The rates of thermal decay are variously characterized in the detailed specification.

10 Claims, 3 Drawing Sheets

CONVEYORIZED COOKING APPARATUS

FIELD AND BACKGROUND OF INVENTION

This invention relates to conveyorized cooking apparatus and particularly to such apparatus useful in a commercial environment such as a fast service restaurant in which rapidly changing variable loads must be accommodated.

Cooking apparatus have been proposed heretofore in which a serving of foodstuff to be cooked is moved through a cooking zone by a driven conveyor. One example is to be found in prior U.S. Pat. No. 4,176,589, to which the interested reader is referred. To any extent necessary or appropriate to an understanding of this invention, the disclosure of that prior patent is hereby incorporated by reference into the present description.

In such prior apparatus as have come into use, the source of heat often is either a fluid fueled burner or an electrical resistance element. The most commonly used electrical resistance element has been a metal or quartz sheathed tubular or rod-like heating element similar to those indicated at 45 and 46 in the drawings of the aforementioned prior patent. While such cooking apparatus have achieved some success, particularly with beef and meat pattie products such as hamburgers, difficulties have appeared as attempts have been made to apply the technology to other applications.

More particularly, such tubular elements, when used at higher watt densities, produce intense strands or ribbons of heat, and emit heat or thermal energy from all surfaces of the tube. Attempts to cook more quickly cooked foodstuffs such as fish or foodstuffs having combustibles such as butter sauces or bread crumbs using cooking apparatus in accordance with the prior art has resulted in an awareness that the initial development of such apparatus for beef and the like was fortuitous in that such foodstuffs are apparently less sensitive to overcooking and flaming which has been found to easily occur due to the response of the heating elements to thermal load imposed by foodstuff to be cooked. As will be understood by persons of skill in the applicable arts, foodstuff introduced into a cooking zone by a conveyor represents a thermal load on the heating elements, in that the elements must supply the thermal energy necessary to accomplish cooking.

All cooking involves temperature regulation. As such, prior conveyorized cooking apparatus of the types with which this invention is concerned have provided for regulation of the temperatures in the cooking zone through which foodstuff is conveyed, typically by controlling fuel flow or electrical energization. Known controls such as thermostats are used for this purpose. The thermal load imposed by foodstuffs to be cooked results in control being exercised to increase the temperature in the cooking zone.

In environments of use, and particularly in fast service restaurants, such thermal load varies over time. At a busy time, the thermal load of foodstuff may be nearly constant and easily handled by conventional controls. At less busy times, the thermal load varies on a continuum between essentially no-load when no foodstuff is passing through the cooking zone and full load when the cooking zone is filled with foodstuff.

The specific problem addressed by this invention arises when thermal loads are less than full, and most particularly when such loads are relatively light. The problem is compounded where the foodstuff being prepared is more temperature sensitive and quick cooking, such as fish. In such circumstances, servings which are introduced into the cooking zone impose a thermal load and the conventional controls and heaters respond by increasing thermal output. Because of the relatively quick rise time required or desired in order to achieve cooking of the foodstuff, the thermal energy released is relatively great, and (in conventional heaters as used prior to this invention) the thermal mass of the heater receives such portion of the energy as is not applied to cooking the serving of foodstuff. For the usual apparatus operating under light load conditions, an electrical resistance heater is repeatedly and relatively rapidly cycled between low energy and high energy states. The thermal mass of the heater is not capable of accomodating such rapid change and, as a consequence, the thermal mass of the heater is raised to an elevated temperature. This elevated temperature, when encountered by the next following serving of foodstuff, is sufficient to cause cooking at an improper rate (typically too quickly due to excessive temperatures gradually built up over a sequence of cycles such as those described). Thus the foodstuffs prepared during light load conditions are of unsatisfactory quality.

The relative concentration of heat in the ribbons or strands mentioned above contributes to the problem stated above, and also creates still other problems. More particularly, a tubular element emits energy in all directions around the element, thus requiring some form of reflector or the like to direct energy from the "back side" of the element toward the foodstuff being cooked. Such reflectors are thermally inefficient and pose difficulty in accurately determining the cooking temperatures within a cooking zone. The "hot ribbon" effect also increases the tendency of foodstuffs toward flaming.

BRIEF DESCRIPTION OF INVENTION

With the foregoing in mind, it is an object of this invention to accomplish conveyorized cooking of servings of foodstuffs in such a way that the effects of variations in load are minimized or eliminated. In realizing this object of the present invention, the influence of stored thermal energy on cooking capabilities is eliminated or reduced to such a point as to become a factor which may be essentially ignored as being ineffective to cause variation in product quality.

Yet a further object of this invention is to provide a conveyorized cooking apparatus having heaters of low thermal mass such that the rate of thermal decay or temperature fall in the absence of thermal load imposed by servings of foodstuffs prevents the cyclical storage of thermal energy and thereby avoids the overcooking of foodstuffs during periods of light usage. In realizing this object of the invention, an apparatus is achieved which is essentially insensitive to fluctuations in cooking load and will produce servings of acceptable quality without regard to whether cooking loads are stable and at a high demand level or fluctuating between light and heavy loads.

Yet a further object of this invention is to provide an apparatus of the general type described in which heat for cooking foodstuff is derived from a surface heating element in which emission of heat or thermal energy is more uniformly spread. In realizing this object of the present invention, the tendency of prior apparatus toward flaming of foodstuffs is reduced.

BRIEF DESCRIPTION OF DRAWINGS

Some of the objects of the invention having been stated, other objects will appear as the description proceeds, when taken in connection with the accompanying drawing, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 2:
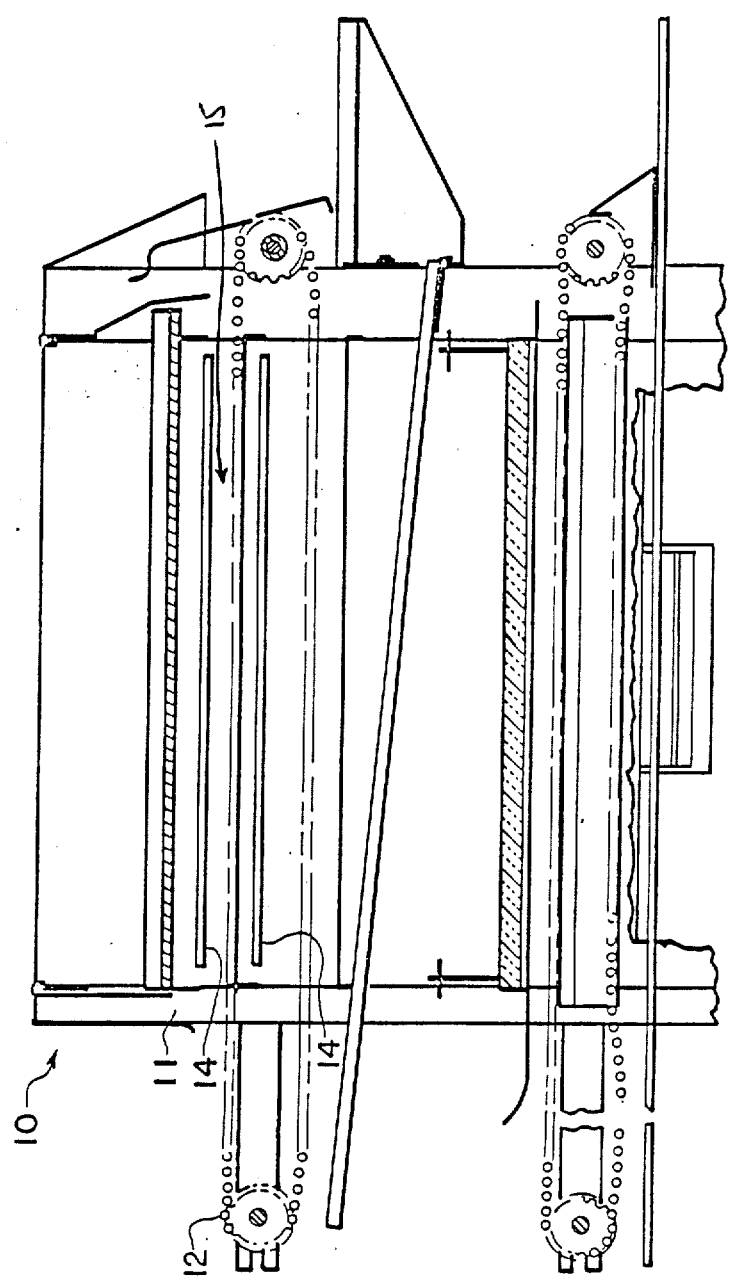
FIG. 2 is an elevation view, in section, of the apparatus of FIG. 1.

Referring now more particularly to the accompanying drawings, a cooking apparatus is there shown and generally indicated at 10 which has a housing 11 enclosing a cooking zone 15 (FIG. 2) for receiving foodstuff to be cooked. A conveyor 12 extends through the cooking zone and is driven for transporting servings of foodstuff therethrough. The apparatus 10 has at least one electrical resistance heater 14 for heating the cooking zone and for cooking foodstuff received therewithin. As described hereinabove, the heater is subject to fluctuation in thermal demand depending upon the absence and presence of thermal loads imposed by foodstuff in the cooking zone.

Figure 1:
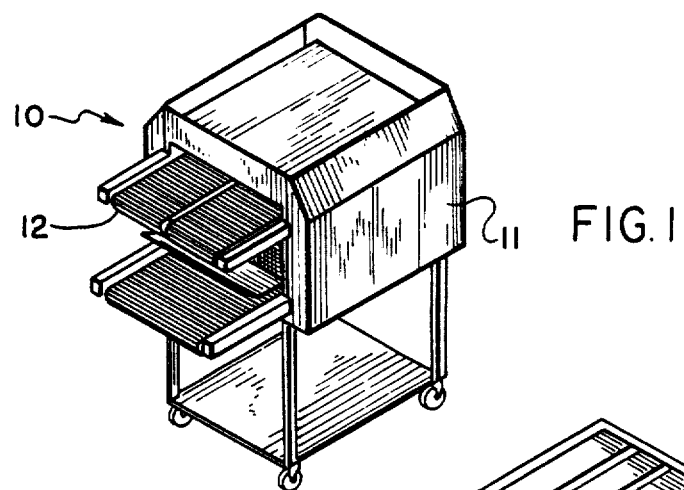
FIG. 1 is a perspective view of an apparatus in accordance with the present invention.
Figure 3:
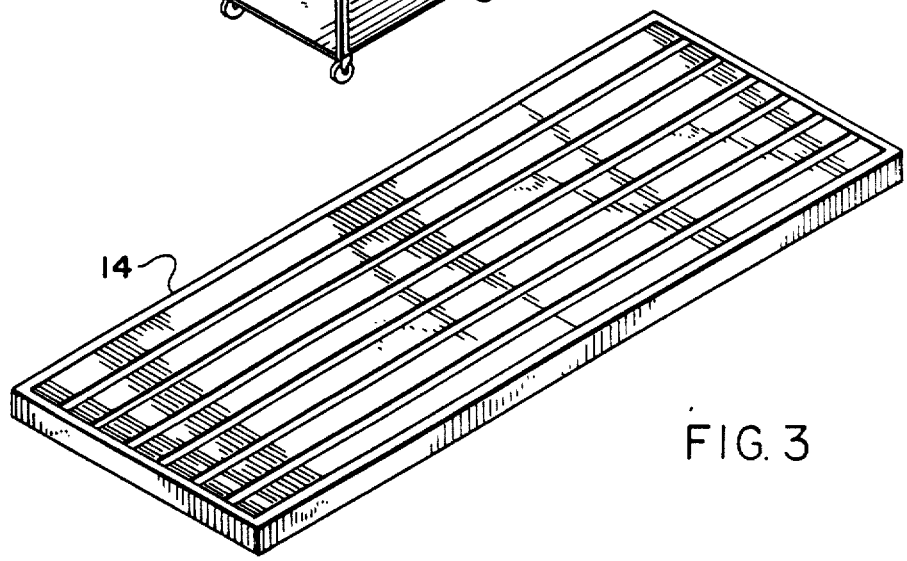
FIG. 3 is a perspective view of a heater used in the apparatus of FIGS. 1 and 2.

In accordance with the present invention, and in order to accomplish satisfactory cooking of foodstuff even under conditions of fluctuating load, the heater 14 has emission surface means (FIG. 3 and as described more fully hereinafter) defining a planar surface for the emission of thermal energy and electrical resistance means for heating said surface means to a predetermined set point temperature. The surface means and resistance means together are characterized by having low thermal mass such that the rate of temperature decay in the cooking zone within the apparatus 10, upon removal of thermal load therefrom is at least about 0.05 percent of the set point temperature per second.

More particularly, it has now been determined that the effects of load variation on the cooking characteristics of an apparatus of the type with which the present invention is concerned may be reduced to the point at which they may be ignored by avoiding the buildup of excessive temperatures in the cooking zone through avoiding the storage of heat or thermal energy in a large thermal mass such as an electrical resistance heater of the types used heretofore. While prior electrical heaters have been able, through sheer wattage and energy emmissivity (in terms of watt density or watts per square inch) used, to provide the fast temperature rise times necessary to emit thermal energy sufficient to cook servings of foodstuff under heavy load conditions, the cycling which occurs under such conditions and the resultant build up of heat or thermal energy in the "thermal flywheel" of the heater introduces the problem of burning foodstuff under light load conditions which this invention addresses. Such heaters are incapable of losing temperature, heat or thermal energy quickly in the absence of load, such as when no servings of foodstuff are passing through the cooking zone. Attempted solutions by spacing such heaters further from the foodstuff being cooked have failed and are uneconomic.

By way of contrast, the heater 14 in accordance with this invention has a low thermal mass, and has the capability of losing temperature, heat or thermal energy quickly as compared with the heaters of the prior art. It has been found that the heater of the present invention, used in an apparatus of the type described, is able to "shed" heat quickly enough that repetitive cycles of heating, as in operation under light load conditions, does not result in overcooking or burning of servings of foodstuff. As set forth hereinabove, one measure of the capability of the heater to perform as contemplated by this invention is the rate of drop or decrease in temperature over time.

Figure 4:
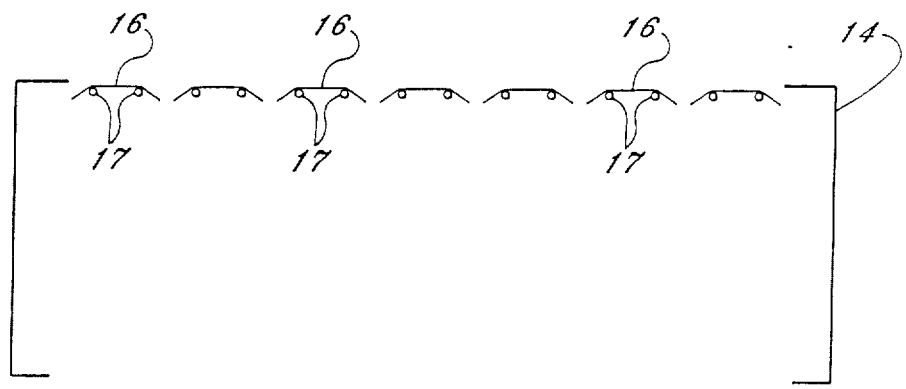
FIG. 4 is an elevation view, in section, of the heater of FIG. 3 showing certain details thereof.

In accordance with this invention, the heater used is formed by a plurality of elongate strips 16 (FIG. 4) of thin metal from which energy is to be emitted and to the reverse side of which are secured electrical resistance heating wires 18. While the strips and heating wires are secured in a supporting frame and are backed by a radiation reflector for limiting heat loss, the thermal mass of the components which are heated during use is relatively low. It is this low thermal mass which avoids the heat buildup which has caused improper operation with the apparatus of the prior art.

When heaters which have performed in accordance with this invention have been analyzed graphically for performance, it has been discovered that, in the time interval following de-energization of the heater, there is an initial short (5 seconds, approximately) period of temperature rise, followed by an essentially straight line decrease or decay in temperature. As will be appreciated, any straight line function may be mathematically represented by an equation in the general form of $$y = mx + b$$

where y and x represent the values on the usual coordinates, m represents the slope of the line on the graph, and b represents the point on the y coordinate at which the line crosses that coordinate. As applied to the graphs of temperature decay in the heaters of the present invention, y represents the temperature, x the time in seconds, and b the starting or set point temperature. In such graphs, the slope m is a negative value, as temperature is dropping with time. It has been determined that the slope m has a value in the range of from about $-0.25$ to about $-3.0$ with the heaters of the present invention.

Expressed differently, the heater 14 of this invention, as used in the apparatus 10, preferably provides, in the apparatus, a rate of temperature decay in the cooking zone upon removal of thermal load therefrom which is in the range of from about 0.05 percent to about 0.3 percent of the set point temperature per second. For a further example, if the set point temperature in the cooking zone is 1000 degrees Fahrenheit, then the temperature decay rate is at least about one half degree per second and is in a range of up to about two degrees per second. Particularly with fast cooking foodstuff which may present a problem, a decay rate closer to the upper limit of the range will be preferable.

As mentioned hereinabove, the heater 14 emits energy from a planar surface. In-accordance with this invention, such emission differs from the "hot ribbon" effect of the heaters of the prior art. Further, a heater as contemplated by this invention provides the capability of controlling the emission in terms of watt density per square inch and location of such emission within the cooking zone area. That is, for some foodstuffs it may be preferable to have a higher watt density (on the order of up to fifteen watts per square inch of heater area) adjacent an entry end of the cooking zone, and a lower watt density (on the order of five watts per square inch) adjacent an exit end of the cooking zone. In any event, it is preferred that the dissipation of heat be in a range of from about five watts to about fifteen watts per square inch of heater area.

In the drawings and specifications there has been set forth a preferred embodiment of the invention and, although specific terms are used, the description thus given uses terminology in a generic and descriptive sense only and not for purposes of limitation.

What is claimed is:

1. In a cooking apparatus having a housing enclosing a cooking zone for receiving foodstuff to be cooked and at least one electrical resistance heater for heating the cooking zone and for cooking foodstuff received therewithin, the heater being subject to fluctuation in thermal demand depending upon the absence and presence of thermal loads imposed by foodstuff in the cooking zone, an improvement in which said heater comprises a low thermal mass electrical resistance heater having thin strip emission surface means defining a planar surface for the emission of thermal energy and electrical resistance means for heating said surface means to a predetermined set point temperature, said surface means and resistance means together being characterized by having low thermal mass such that the temperature decay in said cooking zone upon removal of thermal load therefrom may be graphically represented by a line fitting the equation $$y = mx + b$$

where y is the temperature reached at a time interval after de-energization of the heater, m is the slope of the line, x is the time elapsed after de-energization, and b is the temperature at de-energization, and further wherein the value of m is in a range of from about $-0.25$ to about $-3.00$.

2. In a cooking apparatus having a housing enclosing a cooking zone for receiving foodstuff to be cooked and at least one electrical resistance heater for heating the cooking zone and for cooking foodstuff received therewithin, the heater being subject to fluctuation in thermal demand depending upon the absence and presence of thermal loads imposed by foodstuff in the cooking zone, an improvement in which said heater comprises a low thermal mass electrical resistance heater having thin strip emission surface means defining a planar surface for the emission of thermal energy and electrical resistance means for heating said surface means to a predetermined set point temperature, said surface means and resistance means together being characterized by having low thermal mass such that the rate of temperature decay in said cooking zone upon removal of thermal load therefrom is at least about 0.05 percent of said set point temperature per second.

3. In a cooking apparatus having a housing enclosing a cooking zone, at least one endless chain conveyor for supporting foodstuff and mounted for movement along a closed path of travel extending through the cooking zone, and at least one electrical resistance heater for heating the cooking zone and for cooking foodstuff conveyed therethrough by the conveyor, the heater being subject to fluctuation in thermal demand depending upon the absence and presence of thermal loads imposed by foodstuff in the cooking zone, an improvement in which said heater comprises a low thermal mass electrical resistance heater having thin strip emission surface means defining a planar surface for the emission of thermal energy and electrical resistance means for heating said surface means to a predetermined set point temperature, said surface means and resistance means together being characterized by having low thermal mass such that the temperature decay in said cooking zone upon removal of thermal load therefrom may be graphically represented by a line fitting the equation $$y = mx + b$$

where y is the temperature reached at a time interval after de-energization of the heater, m is the slope of the line, x is the time elapsed after de-energization, and b is the temperature at de-energization, and further wherein the value of m is in a range of from about $-0.25$ to about $-3.00$.

4. In a cooking apparatus having a housing enclosing a cooking zone, at least one endless chain conveyor for supporting foodstuff and mounted for movement along a closed path of travel extending through the cooking zone, and at least one electrical resistance heater for heating the cooking zone and for cooking foodstuff conveyed therethrough by the conveyor, the heater being subject to fluctuation in thermal demand depending upon the absence and presence of thermal loads imposed by foodstuff in the cooking zone, an improvement in which said heater comprises a low thermal mass electrical resistance heater having thin strip emission surface means defining a planar surface for the emission of thermal energy and electrical resistance means for heating said surface means to a predetermined set point temperature, said surface means and resistance means together being characterized by having low thermal mass such that the rate of temperature decay in said cooking zone upon removal of thermal load therefrom is at least about 0.05 percent of said set point temperature per second.

5. Apparatus according to one of claims 2 or 4 and wherein the thermal mass of said heater is such that the rate of temperature decay in said cooking zone upon removal of thermal load therefrom is in the range of from about 0.05 percent to about 0.3 percent of said set point temperature per second.

6. Apparatus according to one of claims 2 or 4 and wherein the thermal mass of said heater is such that the rate of temperature decay in said cooking zone within an interval of thirty seconds after the removal of thermal load therefrom is in the range of from about 0.05 percent to about 0.3 percent of said set point temperature per second.

7. Apparatus according to one of claims 1 through 4 wherein said heater dissipates energy at a rate of at least about 5 watts per square inch of area of said planar surface.

8. Apparatus according to one of claims 1 through 4 wherein said heater dissipates energy at a rate in the range of from about 5 to about 15 watts per square inch of area of said planar surface.

9. In a cooking apparatus having a housing inclosing a cooking zone for receiving foodstuff to be cooked and at least one electrical resistance heater for heating the cooking zone and for cooking foodstuff received therewithin, the heater being subject to fluctuation in thermal demand depending upon the absence and presence of thermal loads imposed by foodstuff in the cooking zone, an improvement in which said heater comprises a low thermal mass electrical resistance heater having thin strip emission surface means defining a planar surface for the emission of thermal energy and wire electrical resistance means for heating said surface means to a predetermined set point temperature, said surface means and resistance means together dissipating energy at a rate in the range of from about 5 to about 15 watts per square inch of area of said planar surface and being characterized by having low thermal mass such that the rate of temperature decay in said cooking zone within an interval of thirty seconds after removal of thermal load therefrom is in the range of from about 0.05 percent to about 0.3 percent of said set point temperature per second.

10. In a cooking apparatus having a housing enclosing a cooking zone for receiving foodstuff to be cooked and at least one electrical resistance heater for heating the cooking zone and for cooking foodstuff received therewithin, the heater being subject to fluctuation in thermal demand depending upon the absence and presence of thermal loads imposed by foodstuff in the cooking zone, an improvement in which said heater comprises a low thermal mass electrical resistance heater having thin strip emission surface means defining a rectangular planar surface of predetermined area for the emission of thermal energy and wire electrical resistance means for heating said surface means to a predetermined set point temperature, said surface means and resistance means together dissipating energy at a rate in the range of from about 5 to about 15 watts per square inch of area of said planar surface and being characterized by having low thermal mass such that the rate of temperature decay in said cooking zone within an interval of thirty seconds after removal of thermal load therefrom is in the range of from about 0.05 to about 0.3 percent of said set point temperature per second.

* * * * *